United States Patent [19]

Schuck

[11] Patent Number: 5,267,894
[45] Date of Patent: Dec. 7, 1993

[54] VENT PIPE TERMINATION WITH FLAPPER AND SIDE VENT

[75] Inventor: Thomas W. Schuck, Easton, Pa.

[73] Assignee: Air Products and Chemicals, Inc., Allentown, Pa.

[21] Appl. No.: 967,089

[22] Filed: Oct. 27, 1992

[51] Int. Cl.⁵ ............................................. F23L 17/06
[52] U.S. Cl. .................................... 454/5; 454/32
[58] Field of Search .................... 454/1, 2, 3, 4, 5, 6, 454/32, 34, 41

[56] References Cited

U.S. PATENT DOCUMENTS

| | | | |
|---|---|---|---|
| 233,584 | 10/1880 | Walker | 454/32 |
| 261,398 | 7/1882 | Smith | 454/32 |
| 295,687 | 3/1884 | Stasch | 454/32 |
| 912,076 | 2/1909 | Cochran | 454/32 |
| 2,774,294 | 12/1956 | Kahle | 454/32 |
| 4,671,171 | 6/1987 | Brill | 454/5 X |
| 4,742,766 | 5/1988 | Davison et al. | 454/5 |

FOREIGN PATENT DOCUMENTS 530 of 1892 United Kingdom .................... 454/4

Primary Examiner—Harold Joyce
Attorney, Agent, or Firm—James C. Simmons; William F. Marsh

[57] ABSTRACT

A vent termination assembly for a vertical pipe, stack or tube including a hinged flapper to normally close the end of said vent termination assembly and at least one downwardly sloping normally open to the atmosphere side pipe bevelled to discharge generally upward. The flapper contains energy adsorbing side beams to reduce velocity of the flapper during opening.

3 Claims, 2 Drawing Sheets

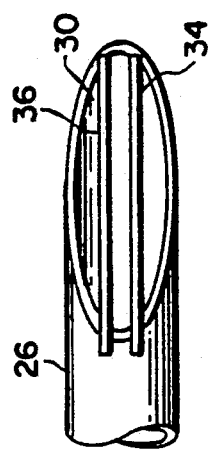
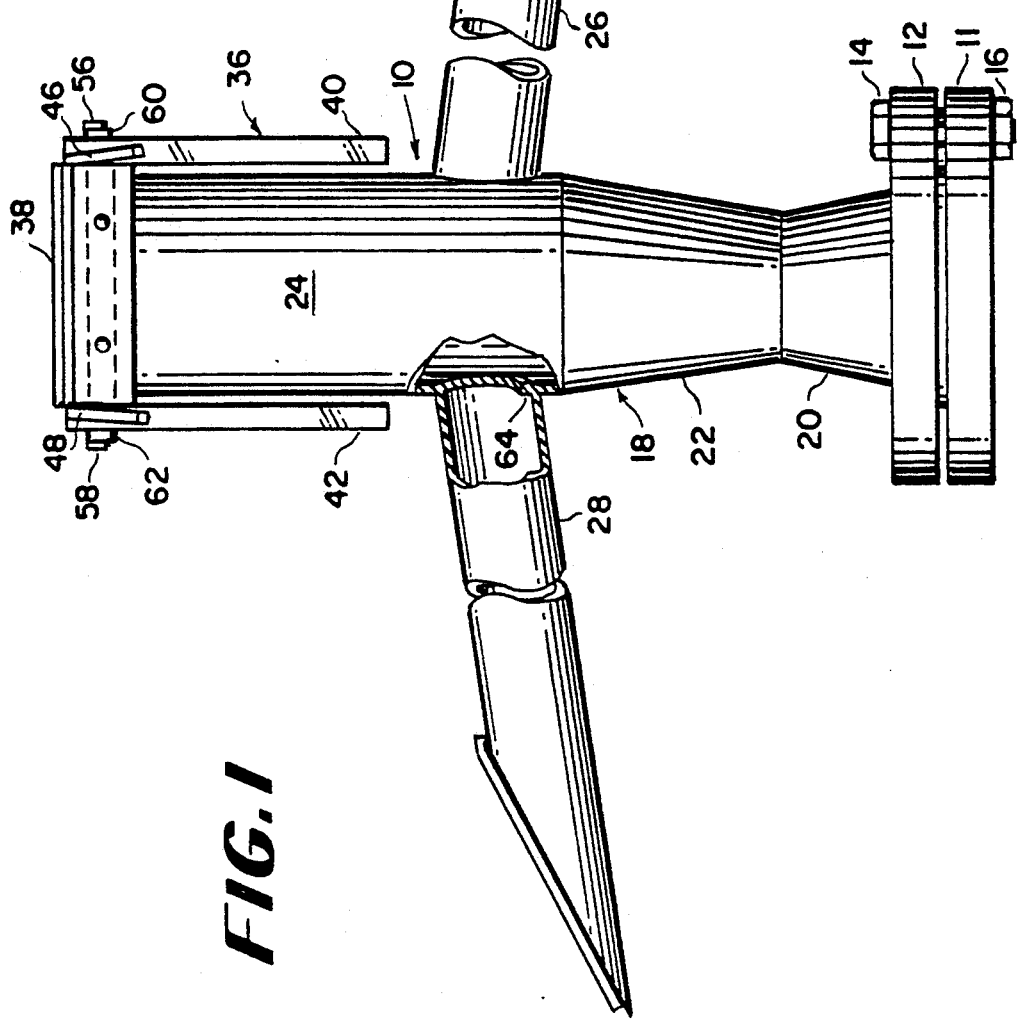

VENT PIPE TERMINATION WITH FLAPPER AND SIDE VENT

FIELD OF THE INVENTION

This invention pertains to vent pipes or stacks used to direct gases venting from a storage vessel away from contact with the areas where persons normally would be present around the vessel.

BACKGROUND OF THE INVENTION

Chemical storage vessels such as liquid hydrogen storage tanks are protected from overpressurization by relief devices. The relief device is normally a control valve that is set to open when internal pressure in the storage vessel reaches a predetermined level. When the valve is opened, material venting from the tank is normally conducted through a vent pipe which is arranged to discharge the venting gas into the air or ambient atmosphere at levels between 12 and 60 feet above grade in the case of a hydrogen storage tank. In the case of storage tanks for normally liquefied gases such as liquid hydrogen, the storage vessels range in size where the inner vessel can contain between 1000 and 25,000 gallons of liquid hydrogen. Normally relief valves on these tanks are set to discharge at 150 psig at 700° F. In addition to the relief valves there are primary rupture discs which are set to relieve at 180 psi g at 70° F. and secondary rupture discs set to relieve at 225 psig at 70° F. The primary rupture discs may discharge into the same vent pipe that the primary relief valves direct the venting gas toward. The secondary discs discharge into a separate vent pipe, directed vertically upward and normally covered by a sealed cap. Normally the vent pipe or stack terminates substantially vertically upward at a distance of 12 to 60 feet above grade on which the tank or storage device is installed so the venting gas is directed substantially vertically upward. In the case of hydrogen, a flammable gas, if ignited, could constitute a hazard to personnel and equipment in the immediate vicinity of the storage vessel. An upwardly directed vent pipe left uncovered in ambient atmosphere and exposed to everyday weather conditions could fill with rain water, which in turn could freeze, thus plugging the vent pipe. Since vent pipes associated with secondary rupture discs do not have valves which could leak and because the burst pressure is greater than the operating pressure, these discs seldom rupture prematurely and thus the vent pipe associated with these discs may be protected from the elements with a sealed cap.

In the past, primary vent pipe closures have used hinged flappers which have had the problem of shearing the hinge pin when the vent was operated or tested thus exposing the vent stack to atmospheric conditions. Branch conduits with downwardly projecting openings have been used, but these would direct the venting gas downwardly instead of upwardly into the ambient atmosphere. Various other devices have been proposed, including internal baffles on vertical uncapped pipes to drain rain or snow while discharging gas vertically upward, and redirecting downwardly exhausted gas from any side pipes upwardly.

SUMMARY OF THE INVENTION

The apparatus of the present invention is a device to terminate a vertical vent pipe, stack, or tube and is particularly useful with a pipe, stack or tube used for venting hydrogen to the atmosphere. The device of the present invention is adapted for mounting on the end of the vent pipe stack or tube and consists of a hinged flapper with extended beams to absorb the opening energy as the flapper contacts a pair of shear pins. In addition, the termination device includes at least one and preferably a pair of downward sloping side pipes terminating in upward facing beveled ends to maintain a continuous path to the atmosphere in the unlikely event that the flapper becomes inoperative and there is a need to vent through the pipe or stack.

BRIEF DESCRIPTION OF THE DRAWING

FIG. 1 is a front elevational view with portions broken away to show interior details of the device of the present invention.

FIG. 2 is a section taken along lines 2—2 of FIG. 1.

Referring to FIG. 1, the vent pipe termination according to the present invention is shown generally at 10 and includes a base or flange 11 which is adapted by means of mating flange 12 and a series of bolts 14 and nuts 16 (one pair only being shown for clarity) to fix the apparatus 10 to a vent pipe, stack, or tube from a storage vessel, the vent stack not shown. The vent pipe termination 10 includes a body 18 having a straight first portion 20 and a diverging second portion 22 connected to the main stack 24.

Intersecting and communicating with the interior of the main stack 24 is at least one and preferably two side pipes 26, 28 which are generally cylindrical tubes which are inclined at a downward angle, the angle being downward relative to the vertical axis of the main stack portion 24 of the vent pipe termination 10 so that when the vent pipe termination 10 is installed on a vent stack which is normally disposed vertically, the pipes 26, 28 slope toward the grade upon which the device containing the vent stack is placed. Side pipes 26, 28 communicate with the interior of the main stack 24 and are continuously opened to the atmosphere. As shown in FIG. 2, the side pipes 26, 28 terminate in a upward facing bevel 30 which is closed by a pair of bars 32, 34 normally used to prevent birds or other large flying animals from nesting in the side pipes 26, 28.

Figure 3:
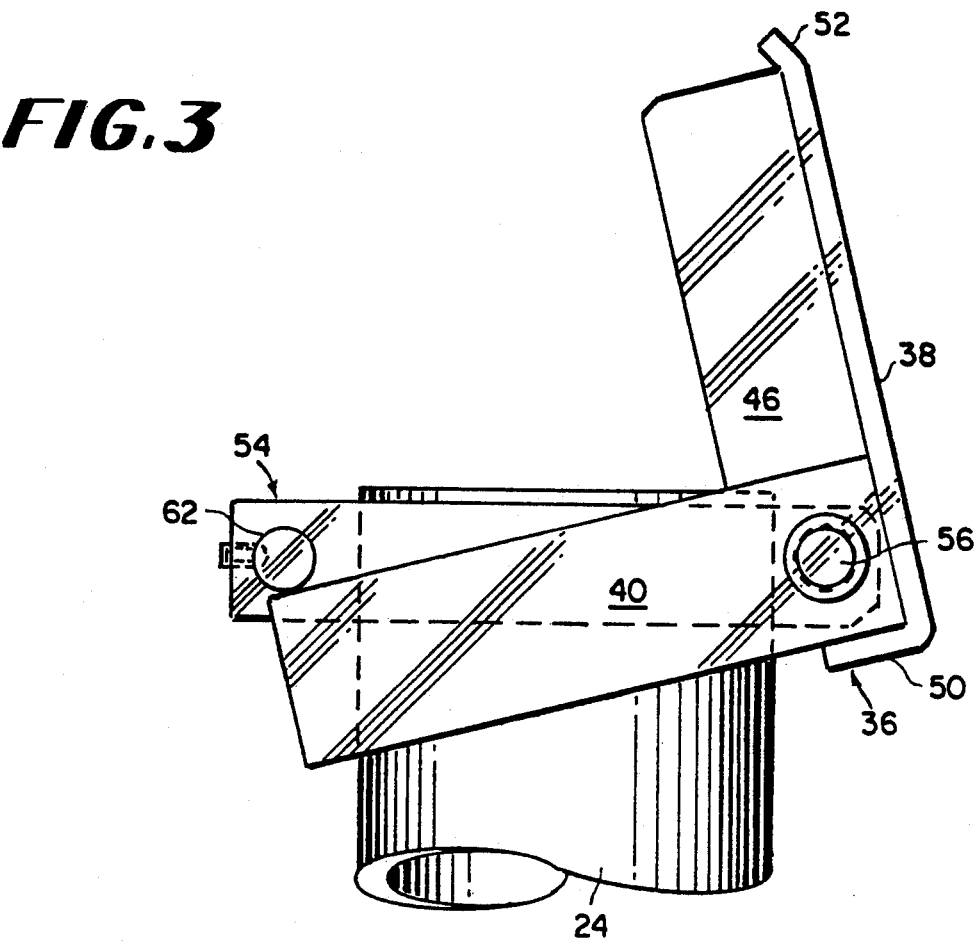
FIG. 3 is an enlarged right side elevational view of the flapper portion of the apparatus of FIG. 1 shown in the open position.
Figure 4:
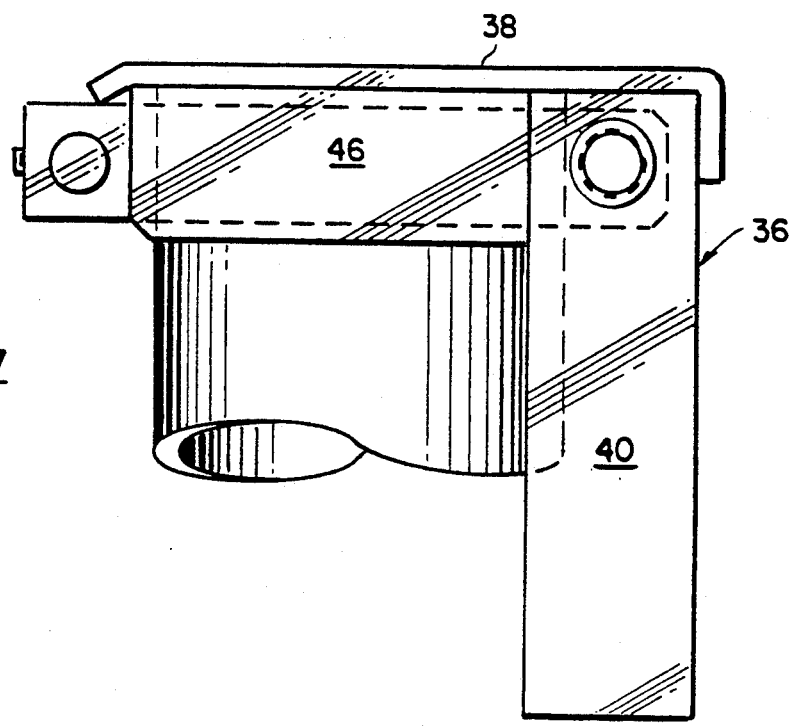
FIG. 4 is a similar view to FIG. 3 as shown in the closed position.

Disposed on the top of the main stack 24 is a closure assembly 36 shown in greater detail in FIGS. 3 and 4. Closure assembly 36 includes a flapper lid 38 fixed to a pair of side bars 40, 42. Fixed to flapper lid 38 and side bars 40, 42 are a pair of side flaps or skirt portions 46, 48. Flapper lid 38 has a rear skirt or flap 50 which serves in cooperation with flaps 46, 48 and front lip 52 to prevent water from entering main stack portion 24. The entire assembly of the lid 38, side bars 40, 42 and skirts 46, 48, 50 define a lid which is hingeably mounted on a mounting frame 54, frame 54 being generally rectangular in shape and adapted to fit around the main stack portion 24 as shown in the drawing. Frame 54 can be fixed to main stack 24 by welding, brazing or the like. The flapper assembly including the top 38 is mounted to the frame 54 by bolts or pins shown as 56, 58. Bolts or pins 56, 58 can be a single rod or any other convenient type of device that will permit the lid 38 to pivot from a closed position shown in FIG. 4 to an open position shown in FIG. 3. Disposed on the mounting frame 54 are a pair of shear pins 60, 62 which are positioned to intercept and contact the side bars 40, 42 respectively when the flapper is moved away from the main stack 24 by the presence of venting gas inside of the vent pipe termination.

A device according to the invention can be fabricated from 3" schedule 10 pipe. The downward sloping side pipes 26, 28 can be fabricated from 1¼" schedule 5 pipe and positioned at a downward sloping angle of 8 degrees to the vertical axis of the main stack 24. The combination of the 3" vent pipe terminator mounted to a 2" schedule 5 or schedule 10 pipe and the side pipes as disclosed produce a minimal side pipe flow when the flapper 38 is in the open position as shown in FIG. 3. The side pipes 26, 28 are joined to the main stack 24 in a manner to create a 0.155" ledge or weir 64. This weir further discourages the entrance of moisture into the vertical run during high lateral winds.

The hinged flapper represents an unsymmetrical obstruction to radial expansion of the sonic flowstream exiting the stack. This may deflect the existing jet somewhat away from the vertical. The angle cannot exceed 45° and the lateral force cannot exceed 207 lbs. The stack must be braced within 21 inches of the lid to absorb this force and prevents longitudinal bending stresses in the pipe from exceeding 16,000 psi.

In normal operation, loading on the flapper assembly including the lid 38 is greatest following bursting of a rupture disc in the pipe associated with the vent stack termination 10. Since the flapper is closed as the compression wave reaches the top of the vent pipe, dynamic pressures at the flapper may approach the vessel pressure. The piping preceding the rupture disc is relatively long on most tanks used to store normally liquefied gases such as hydrogen. Pressure is expected to drop local to the rupture disc immediately after disc rupture until reestablished at sonic speed from the tank. This process would normally take about 10 milliseconds. The flapper cover 38 accelerates during this period and is expected to be fully open in 15 milliseconds and may experience an opening energy input on the order of 866.5 inch-pounds. This energy estimate is based on the center of pressure of the flapper traveling in an arc under a dynamic pressure (steady state) of approximately 33.55 psig. The actual process is considerably more complex.

The flapper accelerates to its open position, but must be brought to rest in a position which will allow it to reclose, in this case by gravity. The sidebars 44, 42 comprise more than half the polar mass moment of the flapper, and reduce the velocity during opening. The bars 40, 42 are intended to flex plastically during impact as they decelerate the flapper assembly 36. The construction of the remainder of the flapper assembly 36 is intended to reduce the possibility that any water may enter the vertical run of the vent, or the hinge assembly. This is accomplished with the side skirts 46, 48 and rear flap 50 and the front ledge 52 which is bent downwardly. The position of the sidebars 40, 42 shifts the flapper center of gravity so that the closing moment is much larger than previous versions of rear hinge flapper designs.

The hinge can be a single piece bar with push-on retaining rings so the hinge pivots in both the frame 54 and the flapper assembly 36 by being disposed in oversize holes to minimize the possibility that moisture will freeze the linkage during discharge.

The sidebars 40, 42 impact on the shear pins 60, 62 mounted in the frame 54 so that they stop the motion of the flapper assembly 36. Two pins are used so that they can be readily replaced after repeated impact.

The device according to the present invention consists of a flapper lid capable of absorbing relatively large opening energy in the sidebars 40, 42 which are intended to bend plastically in combination with the replaceable shear pins 60, 62 to absorb energy by bending plastically thereby reducing the forces at the hinge. In addition, the combination includes side pipes installed at a slightly downward angle to the main stack 24 terminating in a weir to reduce the likelihood that snow or rainwater will be driven into the main pipe. Side pipes 26, 28 terminate in upward facing bevels to direct flow out of the side pipes 26, 28 in a substantially upward direction.

The device according to the present invention prevents snow or rainwater from entering the main vent pipe when the flapper is closed. When venting of gas occurs, the flapper lid 38 swings to the open position, and vents substantially upward to the atmosphere. The impact of sudden stopping of the flapper lid is absorbed in elastic and plastic deformation of the flapper assembly, thus positioning the flapper for closure when venting terminates.

Having thus described my invention, what is desired to be secured by letters patent of the United States is set forth in the pending claims.

I claim:

1. A closure for the free end of a vent stack or pipe comprising in combination:
   a vent pipe termination adapted for positioning proximate the free end of the vent stack or pipe said bent pipe termination including a main stack portion with a frame adapted for mounting on said vent stack or pipe to position a flapper to close said main stack portion and pivot away from said main stack portion when venting occurs;
   said flapper pivotally mounted on said main stack portion, said flapper including a generally flat closure plate and a pair of energy adsorbing bars adapted to contact shear pins disposed in said frame, said energy adsorbing bars and shear pins adapted to absorb energy imparted to said flapper by product exiting said vent stack or pipe through said vent pipe termination;
   a pair of side flaps or skirt portions depending from opposite sides of said closure plate and disposed perpendicular to said energy absorbing bars, a third skirt portion disposed between said pair of side flaps, said side flaps and third skirt portion cooperating to prevent water from entering sad stack when said closure plate closes said vent stack or pipe.

2. A vent for a stack or pipe comprising in combination:
   a base for mounting said vent to a stack or pipe;
   a generally cylindrical pipe being a first or base end, a second or discharge port end said base end mounted on said base, said base and said pipe constructed so that when said vent is mounted on a stack or pipe said vent is a vertical extension of stack or pipe;
   a closure pivotally mounted on said discharge portend of said pipe;
   at least one side vent in the form of a generally cylindrical conduit disposed in said pipe between said first and second ends, said side vent providing a continuously open path between the entrance of said pipe and the environment where the vent is installed.

said side vent being mounted in said pipe with its longitudinal axis at a downward angle to the longitudinal axis of said pipe when said vent is in use said side vent being a first end fixed to said pipe and a second end being an upward facing discharge poet formed by cutting said vent conduit at an acute angle to its longitudinal axis to form a beveled opening.

3. A vent according to claim 2 wherein there are two side vents disposed approximately 180° apart around the circumference of said pipe.

* * * * *